United States Patent
Oestlund (10) Patent No.: US 10,372,407 B2
(45) Date of Patent: Aug. 6, 2019

(54) PAIRWISE AUDIO CAPTURE DEVICE SELECTION

(71) Applicant: Avaya Inc., Basking Ridge, NJ (US)

(72) Inventor: Nils Oestlund, Robertsfors (SE)

(73) Assignee: Avaya Inc., Basking Ridge, NJ (US)

( * ) Notice: Subject to any disclaimer, the term of this patent is extended or adjusted under 35 U.S.C. 154(b) by 1012 days.

(21) Appl. No.: 13/970,178

(22) Filed: Aug. 19, 2013

(65) Prior Publication Data

US 2015/0049885 A1    Feb. 19, 2015

(51) Int. Cl.
*H04R 3/00* (2006.01)
*G06F 3/16* (2006.01)
*H04R 27/00* (2006.01)

(52) U.S. Cl.
CPC ............ *G06F 3/165* (2013.01); *H04R 27/00* (2013.01); *H04R 3/005* (2013.01)

(58) Field of Classification Search
CPC ............ H04R 2430/21; H04R 2430/03; H04R 29/006; H04R 3/00; G10L 2021/02166; G10L 21/0264; G06F 3/165; G10K 11/1784
USPC .................................................. 381/92, 122
See application file for complete search history.

(56) References Cited

U.S. PATENT DOCUMENTS

| | | | | |
|---|---|---|---|---|
| 2003/0059061 A1* | 3/2003 | Tsuji | ...................... | H04M 3/569 381/92 |
| 2009/0052688 A1* | 2/2009 | Ishibashi | ................. | H04R 1/403 381/92 |
| 2009/0323977 A1* | 12/2009 | Kobayashi | ............. | H04R 1/406 381/71.8 |
| 2011/0058683 A1* | 3/2011 | Kosteva | ................. | H04R 3/005 381/92 |
| 2011/0082690 A1* | 4/2011 | Togami | ................... | H04R 1/406 704/201 |

* cited by examiner

*Primary Examiner* — George C Monikang (57) ABSTRACT

Embodiments disclosed herein provide systems and methods for pairwise audio capture device selection. In a particular embodiment, a method provides capturing audio information via a plurality of audio capture device pairs, wherein each audio capture device pair comprises a first audio capture device and a second audio capture device. Based on the audio information, the method provides determining a difference in audio energy between audio captured by the first and second audio capture devices for each of the plurality of audio capture device pairs. The method further provides selecting an audio capture device pair of the plurality of audio capture device pairs based on the audio capture device pair having the largest difference in audio energy.

20 Claims, 7 Drawing Sheets

| MIC PAIR | AUDIO ENERGY DIFFERENTIAL | | |
| --- | --- | --- | --- |
| | Freq. 1 | Freq. 2 | Freq. 3 |
| 301,302 | 40 dB | 43 dB | 35 dB |
| 303,304 | 23 dB | 26 dB | 19 dB |
| 305,306 | 29 dB | 36 dB | 27 dB |

PAIRWISE AUDIO CAPTURE DEVICE SELECTION

TECHNICAL BACKGROUND

Audio capture systems can rely on multiple audio capture devices to properly capture sound in a particular location. These systems use more than one device because, in some situations, a single audio capture device may not be suited for capturing audio coming from different directions and different areas of the location. For example, an audio capture system may be positioned to capture audio within a room. A single audio capture device, such as a microphone, positioned in the center of the room, may be able to sufficiently capture audio from sources close to the center of the room while audio from sources further from, or not directly facing, the center of the room is less sufficiently captured. Therefore, multiple capture devices may be positioned to better capture audio from different areas of the room.

Although multiple capture devices may be used in an audio capture system, it may not always be appropriate to use all of the devices at a single time. For instance, if a person is talking in the center of the room, the microphones at the edge of the room may be useless or cause interference. For such reasons, an audio system may ignore audio from these devices to improve the audio quality.

OVERVIEW

Embodiments disclosed herein provide systems and methods for pairwise audio capture device selection. In a particular embodiment, a method provides capturing audio information via a plurality of audio capture device pairs, wherein each audio capture device pair comprises a first audio capture device and a second audio capture device. Based on the audio information, the method provides determining a difference in audio energy between audio captured by the first and second audio capture devices for each of the plurality of audio capture device pairs. The method further provides selecting an audio capture device pair of the plurality of audio capture device pairs based on the audio capture device pair having the largest difference in audio energy.

In some embodiments, the method provides selecting an audio capture device from the audio capture device pair having the greater amount of audio energy.

In some embodiments, the method provides, if a ratio of audio energy captured by the first audio capture device to audio energy captured by the second audio capture device is within a threshold of 1, also selecting an audio capture device from the audio capture device pair having the lesser or equal amount of audio energy.

In some embodiments, the method provides that determining the difference in audio energy between the audio captured by the first and second audio capture devices for each of the plurality of audio capture device pairs comprises, for each of the plurality of audio capture device pairs, determining a difference in audio energy between the first and second audio capture devices at each frequency of a plurality of frequencies. The difference in audio energy for each of the plurality of audio capture device pairs comprises the difference in audio energy at a frequency in which the difference in audio energy is maximized.

In some embodiments, the method provides that the plurality of frequencies comprise frequencies audible to human ears.

In some embodiments, the method provides that a frequency selection function is used to select each frequency.

In some embodiments, the method provides determining captured audio energy for each of the first and second audio capture devices for each of the plurality of audio capture device pairs.

In some embodiments, the method provides that the first and second audio capture devices comprise first and second unidirectional microphones.

In some embodiments, the method provides that the first and second unidirectional microphones capture audio in opposite directions along an axis.

In some embodiments, the method provides that the audio energy comprises an amplitude of a captured audio signal.

In a further embodiment, a device selection system for pairwise audio capture device selection is provided. The microphone selection system includes an interface configured to receive audio information captured via a plurality of audio capture device pairs, wherein each audio capture device pair comprises a first audio capture device and a second audio capture device. The microphone selection system further includes a processing system configured to, based on the audio information, determine a difference in audio energy between audio captured by the first and second audio capture devices for each of the plurality of audio capture device pairs. The processing system is further configured to select an audio capture device pair of the plurality of audio capture device pairs based on the audio capture device pair having the largest difference in audio energy.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
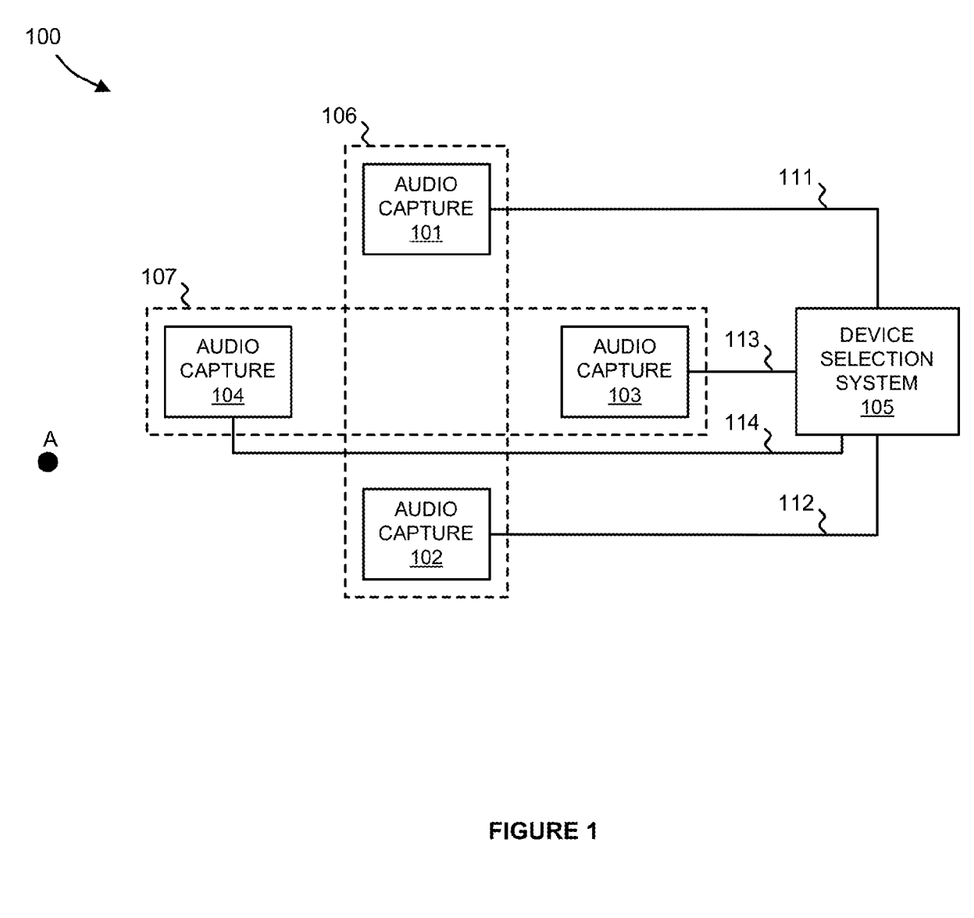
FIG. 1 illustrates an audio capture system for pairwise audio capture device selection.

FIG. 1 illustrates audio capture system 100. Audio capture system 100 includes audio capture devices 101-104 and device selection system 105. Audio capture devices 101-104 and device selection system 105 communicate over communication links 111-114, respectively. The positions of audio capture devices 101-104 illustrated in FIG. 1 correspond to a top down view of the audio capture devices within a physical space, although, the exact positioning of the devices relative to one another may vary. The positioning of device selection system 105 is not consequential. The positioning of audio captured devices 101-104 is intended to capture sound from outside the shape formed by the positioning of the devices.

In operation, audio capture system 100 is used to capture voice, music, or any other type of audio information. Audio capture system 100 uses multiple audio capture devices 101-104 because, in many situations, a single audio capture device may not be suited for capturing audio coming from different directions and different areas of a location. For example, audio capture system 100 may be positioned to capture audio within a room. A single audio capture device, such as a microphone, positioned in the center of the room may be able to sufficiently capture audio from sources close to the center of the room while audio from sources further from, or not directly facing, the center of the room is less sufficiently captured. Therefore, multiple capture devices 101-104 may be positioned to better capture audio from different areas of the room.

While audio capture devices 101-104 may be positioned to capture audio from different areas of a space, the audio from all of the devices may not be relevant or needed at all times. For example, if a single person is speaking, then only a select subset of devices 101-104 may be sufficiently capturing the speaker's voice. Therefore, device selection system 105 may be used to select the audio capture device(s) that are best capturing the speaker's voice. Audio captured by the selected audio capture device(s) can then be used for it's intended purpose (i.e. recorded, amplified, routed over a telecom network, etc.) without the unneeded audio captured by the other, not selected, device(s).

Figure 2:
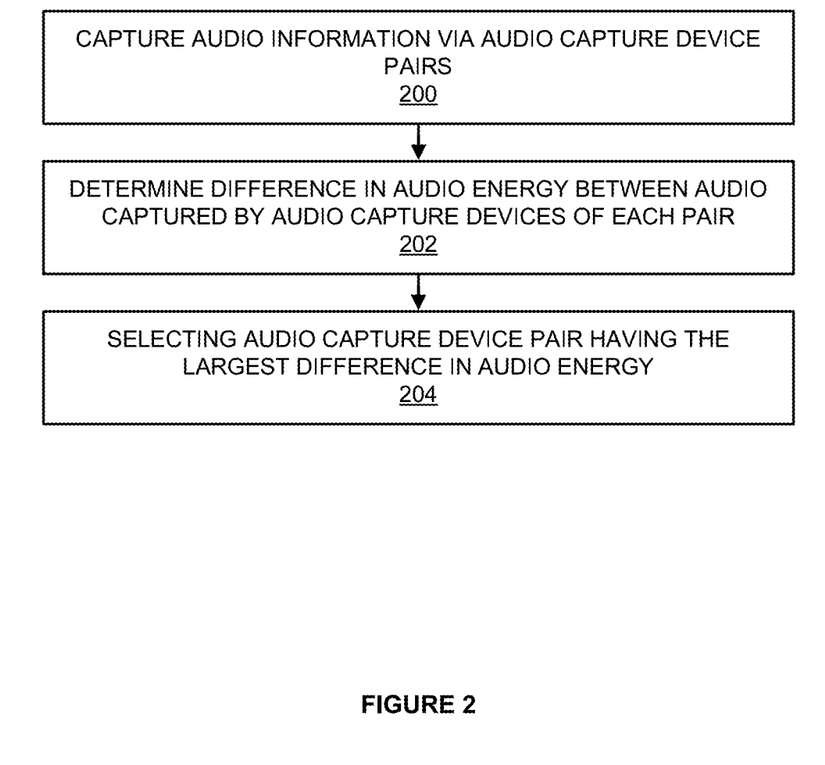
FIG. 2 illustrates an operation of the audio capture system for pairwise audio capture device selection.

FIG. 2 illustrates the operation of audio capture system 100 to perform pairwise audio capture device selection. Audio information is captured via a plurality of audio capture device pairs (step 200). In this embodiment, audio capture devices 101 and 102 make up audio capture device pair 106 and audio capture devices 103 and 104 make up audio capture device pair 107. Each audio capture device captures audio information from the sound waves received at each audio capture device. The audio information captured by each of devices 101-104 may be transferred to device selection system 105 over communication links 111-114, respectively, as an analog or digital signal that represents the captured audio information (e.g. the frequencies and amplitude of the audio captured by each capture device).

Based on the audio information, microphone selection system 105 determines a difference in audio energy between audio captured by the audio capture devices for each of the audio capture device pairs 106 and 107 (step 202). The audio energy for the captured audio is based upon the amplitude of the sound waves as captured by each of the capture devices. The amplitude may be represented in decibels (dB) or any other unit that represents amplitude of a sound wave. Greater amplitudes correspond to greater audio energies. The difference in audio energy for audio capture device pair 106 therefore equates to the absolute value of the difference in audio energy determined by subtracting the audio energy captured by audio capture device 101 from the audio energy captured by audio capture device 102. Likewise, the difference in audio energy for audio capture device pair 107 equates to the absolute value of the difference in audio energy determined by subtracting the audio energy captured by audio capture device 103 from the audio energy captured by audio capture device 104.

Device selection system 105 then selects an audio capture device pair of audio capture device pairs 106 and 107 based on the audio capture device pair having the largest difference in audio energy (step 204). The audio capture device pair having the largest difference in audio energy indicates to device selection system 105 that one of the devices in the audio capture device pair is best positioned for capturing audio at the time the audio information is received. This indication is true because the a sound originating closer to one device in the pair will have higher energy when captured by that device than when captured by the device further away in the pair. Furthermore, based on the positioning of devices 101-104 relative to one another, the pair having the best positioned device would have the greatest energy differential because the captured audio energy would be greatest at the closest device and lowest at the farthest device.

For example, if a sound represented in the audio information originated from point A illustrated in FIG. 1, then device selection system 105 would likely determine that audio capture device pair 107 has the greatest audio energy differential. Specifically, audio capture device 104 will receive the sound at the highest energy while audio capture device 103 will receive the sound at the lowest energy of all the devices because the sound had the farthest to travel and attenuate en route to audio capture device 103. Moreover, since the difference in the distances of audio capture devices 101 and 102 in pair 106 relative to point A is less than that of devices 104 and 103, the differential between the audio energy captured by devices 101 and 102 is lower.

In embodiments wherein audio capture devices 101-104 comprise unidirectional microphone directed to capture sound away from each other, the direction of the microphones affects the energy of the audio captured at each device of a pair more so than the distance between the devices of a pair. Accordingly, even if audio capture devices 103 and 104 are placed back to back, audio capture device 104 will receive greater audio energy from point A than would audio capture device 103, which is substantially directed to capture audio from sources away from point A.

After selecting the audio capture device pair, device selection system 105 may then determine which of the audio capture devices within the pair is the device best suited to capture the audio. Accordingly, device selection system 105 selects the device of the pair that has the highest audio energy. Other factors, such as phase of the captured audio, may also be considered with selecting a device within the pair. Once the particular device is selected, that device may be used for recording the audio information captured by the device (e.g. storing the information on a hard drive, flash drive, or other type of memory for later retrieval, copying, and/or playback), amplifying the audio (e.g. through a speaker system to an audience), transferring the audio over a network (e.g. to other parties on a conference call), or any other use that a system may have for audio information—including combinations thereof. Device selection system 105 may use the audio information from the selected device, transfer or forward the audio information to another system for use, or indicate to another system that also receives audio information from devices 101-104 which audio capture device's audio information should be used. In some embodiments, rather than using only audio from a specific device system 105 may calibrate the audio from all devices so that audio from the selected device is given preference (e.g.

enhance audio received from the selected device more so than audio from other devices).

The process described above may be repeated on a continual basis to account for changes in sound origination points. For example, as different people speak in different areas of a room where audio capture system 100 is located, device selection system 105 may continually have to select difference audio capture devices in order to ensure the voice of the current speaker is properly captured.

In other embodiments, rather than selecting an audio capture device for use in recording, transmitting, etc., device selection system 105 may instead apply a weight to the selected audio capture device. For example, a higher weight may correspond to an audio capture device that is receiving the greater audio energy within the selected audio capture device pair. Similarly, steps 200-204 may repeat in a recursive manner so that weights are adjusted up and down based on new audio energies captured by audio capture devices 101-104. The weight for a particular audio capture device receiving the greatest audio energy may be increased while the weights of other devices may be decreased. The weights of audio capture devices 101-104 at any particular time may then be considered by device selection system 105 when determining how to use audio captured by the devices during that time. For example, system 105 may focus on or prefer audio captured by devices having greater weights rather than those devices having lessor weights at a particular time.

Referring back to FIG. 1, audio capture devices 101-104 may each comprise a microphone or some other mechanism for capturing sound as audio information. Audio capture devices 101-104 may further include processing and communication circuitry to process the audio information and transfer the audio information to device selection system 105. While displayed as discrete elements, audio capture devices 101-104 may be incorporated into device selection system 105, into fewer elements of multiple devices, or incorporated into some other system.

Device selection system 105 comprises a computer system and communication interface. The communication interface is configured to receive audio information from audio capture devices 101-104 and may also be configured to exchange communications with other systems over a communication network or otherwise. Device selection system 105 may reside in a single device or may be distributed across multiple devices. Device selection system 105 is shown as a discrete system, although, device selection system 105 may be incorporated into other systems.

Communication links 111-114 use metal, glass, air, space, or some other material as the transport media. Communication links 111-114 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 111-114 could be direct links or may include intermediate networks, systems, or devices.

Figure 3:
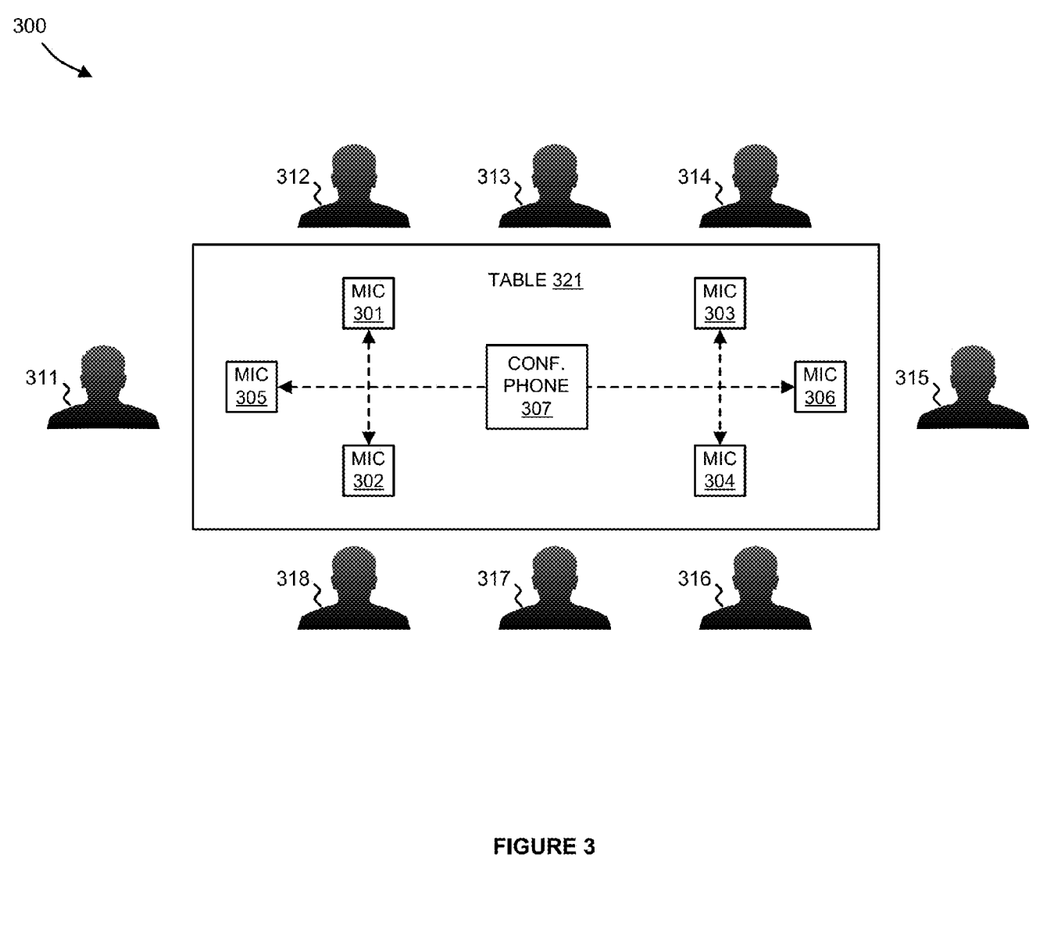
FIG. 3 illustrates an audio capture environment for pairwise audio capture device selection.

FIG. 3 illustrates audio capture environment 300. Audio capture environment 300 includes unidirectional microphones 301-306, people 311-318, conference phone 307, and conference table 321. It should be understood that, although microphones 301-306 are illustrated separately, microphones 301-306 may be incorporated into conference phone 307 to form a single unit while maintaining the same unidirectional orientation. Additionally, it should be understood that the location of microphones 301-306 within the room is relatively unimportant (e.g. microphones 301-306 do not necessarily need to be positioned around the center of the room). Rather, the orientation of microphones 301-306 relative to one another (e.g. directed away from the other microphone in a pair) is more significant, as will be made clear below.

In this embodiment, audio capture environment 300 is located within a conference room. In operation, conference phone 307 is located in the conference room so that people within the room can participate in conference calls with remote parties. Unidirectional microphones 301-306 are in communication with conference phone 307 in order to capture audio from people 311-318 for conference calls connected over conference phone 307. Unidirectional microphones 301 and 302 form a first microphone pair, unidirectional microphones 303 and 304 form a second microphone pair, and unidirectional microphones 305 and 306 form a third microphone pair. Each unidirectional microphone captures audio from the direction pointed to by the arrows indicating each pair (e.g. unidirectional microphone 301 is directed to capture audio coming from the general direction of person 312).

Figure 4:
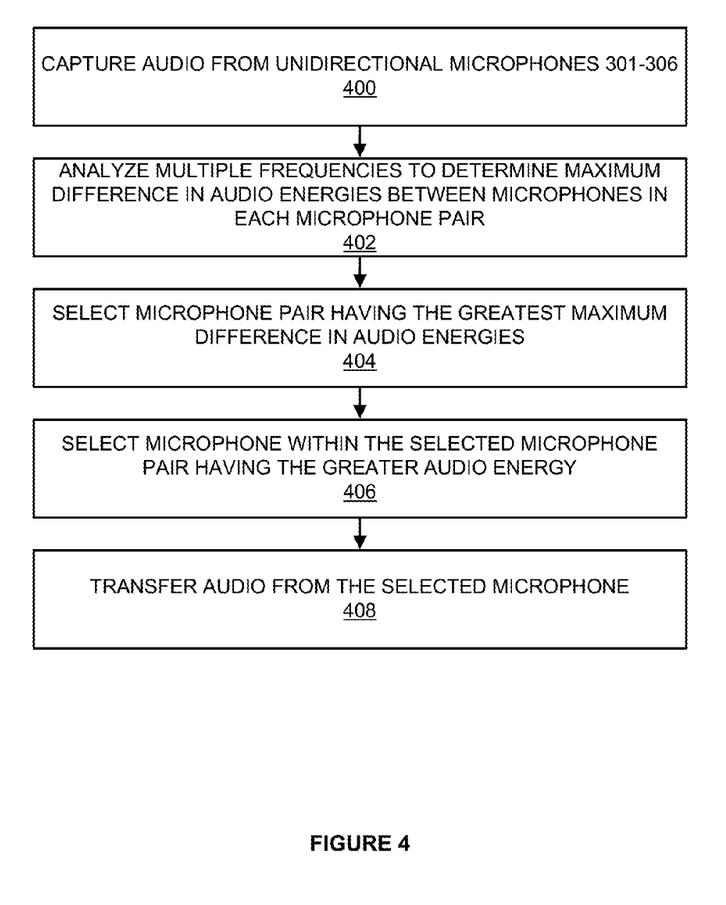
FIG. 4 illustrates an operation of an audio capture system in the audio capture environment for pairwise audio capture device selection.

FIG. 4 illustrates the operation of conference phone 307 in audio capture environment 300 to perform pairwise audio capture device selection. During a conference call, conference phone 307 captures audio from within the conference room via unidirectional microphones 301-306 (step 400). The audio may include the voice of any of people 311-318 that speak during the call as well as any other sound occurring in the background.

To determine which audio information should be transferred to the other party or parties on the conference call, conference phone 307 analyzes audio information captured by each microphone to determine the audio energy captured by each microphone at multiple frequencies to determine a maximum difference in audio energy for each microphone pair (step 402). That is, the difference in audio energy for a given microphone pair may be different at different frequencies. Therefore, conference phone 307 analyzes multiple frequencies to determine the maximum difference. The maximum difference for each microphone pair may be realized at different frequencies.

In some embodiments, conference phone 307 uses a frequency selection function that directs conference phone 307 as to which frequencies should be analyzed for audio energy differentials. These range of frequencies selected for analysis may be limited to frequencies that are audible to the human ear. Moreover, the range of frequencies may be limited to a frequency range most common in human speech as human speech is most likely the type of sound that will be transmitted to other parties on a conference call.

Once the maximum difference has been determined for each of the microphone pairs, conference phone 307 selects the microphone pair having the largest difference in audio energies (step 404). The unidirectional aspect of the microphones in audio capture environment 300 further distinguishes the difference in audio energies between a microphone that is directed more towards the source of a sound and that microphone's pair that is facing away. For example, if person 315 is speaking towards unidirectional microphone 306, then the sound from person 315 has even less energy across the table at unidirectional microphone 305 since unidirectional microphone 305 is directed away from person 315.

Conference phone 307 then selects the microphone within the selected pair having the greater of the two audio energies that were used previously to calculate the maximum audio energy differential between the two microphones (step 406). The audio information from that microphone is then used to transfer audio for the conference call to other parties on the conference call (step 408). While Conference phone 307 transmits the audio information from the selected microphone to other parties on the conference call, conference phone 307 continues to capture audio via the other microphones and repeats the process described above. Accordingly, if the process results conference phone 307 selecting another microphone (possibly caused by a change in the person speaking or by the speaker changing the direction in which he or she is speaking), then conference phone 307 transfers the audio information from that selected microphone to other parties on the call.

Figure 5:
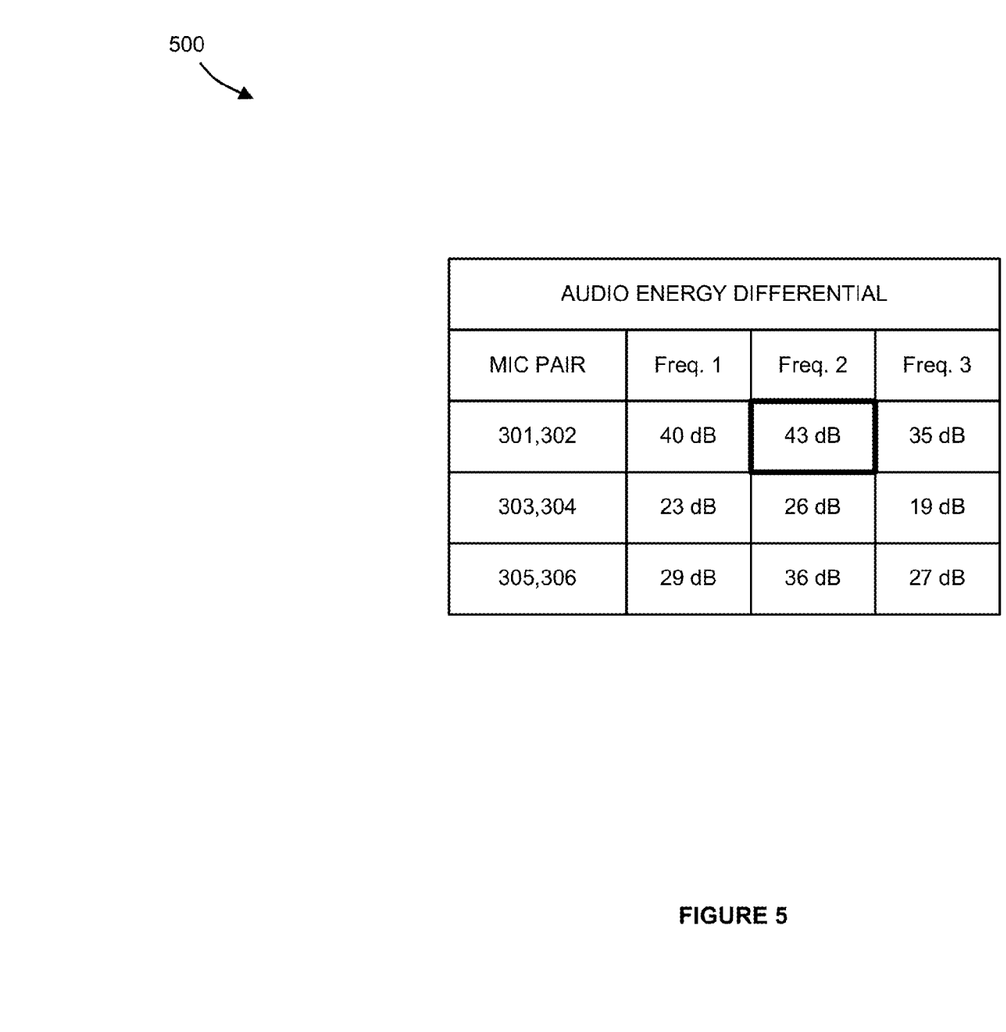
FIG. 5 illustrates an exemplary table of values used for pairwise audio capture device selection.

FIG. 5 illustrates audio energy differential table 500 in an example of the differentials determined above at step 402. In this embodiment, the frequency selection function indicates 3 frequencies for which the audio information differential of each microphone pair should be determined. These frequencies may include a frequency in the low range of the vocal frequency spectrum (Freq. 1), a frequency in the mid range of the vocal frequency spectrum (Freq. 2), and a frequency in the high range of the vocal frequency spectrum (Freq. 3). Other embodiments may use more or fewer frequencies or other frequency ranges. The audio energies presented in table 500 are represented in dB, although, other units of audio energy may also be used.

In this example, person 318 is currently speaking and unidirectional microphone 302 is positioned to capture audio from the direction of person 318. Person 318 has a voice with highest audio energy near the mid range of the vocal frequency spectrum. Accordingly, conference phone 307 determines that the microphone pair comprising unidirectional microphones 301 and 302 has the largest difference in audio energies among all microphone pairs at Freq. 2. In an alternative example, had person 318 spoke with a higher frequency voice, then the largest difference may have occurred at Freq. 3. Likewise, had person 318 spoke with a higher frequency voice, then the largest difference may have occurred at Freq. 1.

Once conference phone 307 has determined that the microphone pair having microphones 301 and 302 has the highest differential, conference phone 307 selects the microphone of microphones 301 and 302 that has the highest audio energy at Freq. 2 (the frequency at which the differential was determined). In this example, since person 318 is speaking directly towards microphone 302, conference phone 307 identifies that microphone 302 is capturing the higher energy audio than microphone 301.

Figure 6:
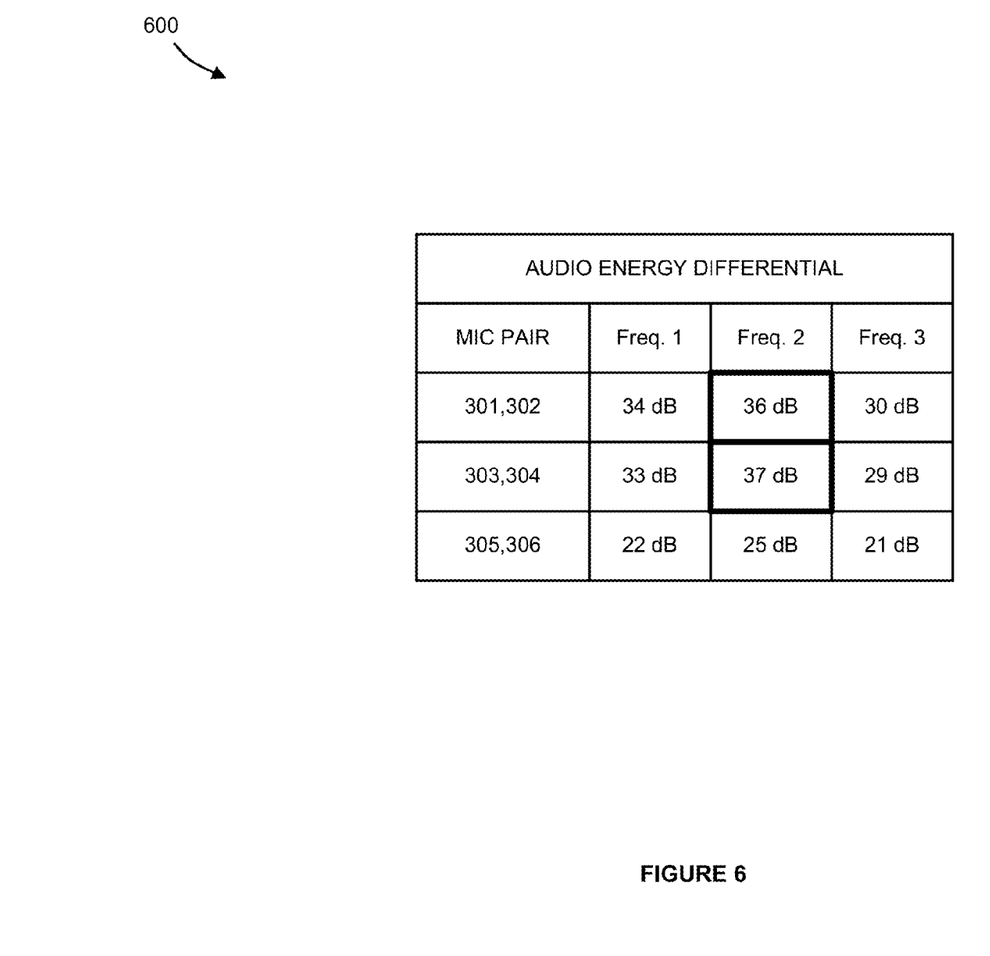
FIG. 6 illustrates an exemplary table of values used for pairwise audio capture device selection.

FIG. 6 illustrates audio energy differential table 600 in an example of the differentials determined above at step 402. In this embodiment, the frequency selection function indicates 3 frequencies for which the audio information differential of each microphone pair should be determined. These frequencies may include a frequency in the low range of the vocal frequency spectrum (Freq. 1), a frequency in the mid range of the vocal frequency spectrum (Freq. 2), and a frequency in the high range of the vocal frequency spectrum (Freq. 3). Other embodiments may use more or fewer frequencies or other frequency ranges. The audio energies presented in table 600 are represented in dB, although, other units of audio energy may also be used.

In this example, person 313 is currently speaking and both unidirectional microphone 302 and unidirectional microphone 303 are positioned to capture audio from the direction of person 313. Person 313 has a voice with highest audio energy near the mid range of the vocal frequency spectrum. Accordingly, conference phone 307 determines that the microphone pair comprising unidirectional microphones 303 and 304 has the largest difference in audio energies among all microphone pairs at Freq. 2. However, conference phone 307 also determines that microphone pair comprising microphones 301 and 302 has an audio energy differential very close to that of the pair comprising microphones 303 and 304. Therefore, in this example, conference phone 307 selects both microphone pairs. Specifically, conference phone 307 may be configured to select multiple pairs if the energy differential for the multiple pairs is within a threshold (e.g. 2 dB) of one another.

Once conference phone 307 has determined the microphone pairs, conference phone 307 selects the microphones of the microphone pairs that have the highest audio energy at Freq. 2 (the frequency at which the differential was determined). In this example, since person 313 is speaking between microphones 301 and 303, conference phone 307 identifies that microphones 301 and 303 are capturing the higher energy audio than microphones 302 and 304.

In a similar concept to that presented above with respect to FIG. 6, person 312 and person 316 may be speaking at the same time to cause the differentials shown in table 600. In that situation, conference phone 307 selects microphones 301 and microphones 302 within the microphone pairs that have the higher audio energy. In yet a further example, while not shown in FIG. 6, the two speakers may be person 312 and 318. In that situation, the differential between microphones 301 and 302 may not be the largest. However, the audio energies received by the two microphones may be greater than the other microphones. Accordingly, if the ratio of the audio energies between microphones 301 and 302 are close enough to 1 (i.e. within a predetermined threshold of 1), then conferencing phone 307 may choose both microphones 301 and 302 for audio information.

Figure 7:
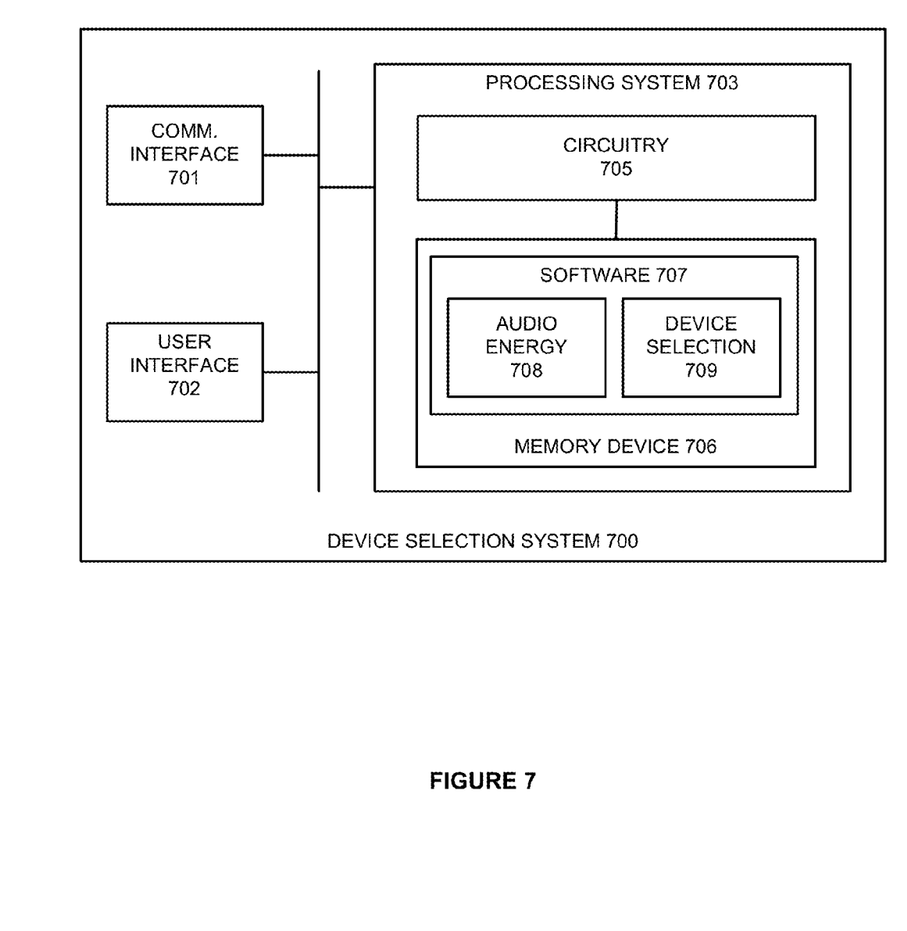
FIG. 7 illustrates a device selection system for pairwise audio capture device selection.

FIG. 7 illustrates device selection system 700. Communication control system 700 is an example of device selection system 105, although system 105 may use alternative configurations. Communication control system 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof. Communication interface 701 is configured to receive audio information captured via a plurality of audio capture device pairs, wherein each audio capture device pair comprises a first audio capture device and a second audio capture device User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Operating software 707 comprises computer programs, firmware, or some other form of machine-readable processing instructions. Operating software 707 includes audio energy module 708 and device selection module 708. Operating software 707 may further include an operating system, utilities, drivers, network interfaces, applications, or some other type of software. When executed by circuitry 705, operating software 707 directs processing system 703 to operate communication control system 700 as described herein.

In particular, audio energy module 708 directs processing system 703 to, based on the audio information received via interface 701, determine a difference in audio energy between audio captured by the first and second audio capture devices for each of the plurality of audio capture device pairs. Device selection module 709 directs processing system 703 to select an audio capture device pair of the plurality of audio capture device pairs based on the audio capture device pair having the largest difference in audio energy.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a microphone selection system, comprising:
   capturing audio information via a plurality of audio capture device pairs, wherein each audio capture device pair comprises a first audio capture device and a second audio capture device, wherein neither the first audio capture device nor the second audio capture device is included in any of the other audio capture device pairs of the plurality of audio capture device pairs, and wherein a first axis along which at least a first pair of the audio capture device pairs are positioned crosses a second axis along which a second pair of the audio capture device pairs are positioned;
   based on the audio information, determining a difference in audio energy between audio captured by the first and second audio capture devices for each of the plurality of audio capture device pairs; and
   selecting an audio capture device pair of the plurality of audio capture device pairs having the largest difference in audio energy.

2. The method of claim 1, further comprising:
   selecting an audio capture device from the audio capture device pair having the greater amount of audio energy.

3. The method of claim 2, further comprising:
   if a ratio of audio energy captured by the first audio capture device to audio energy captured by the second audio capture device is within a threshold of 1, also selecting an audio capture device from the audio capture device pair having the lesser or equal amount of audio energy.

4. The method of claim 1, wherein determining the difference in audio energy between the audio captured by the first and second audio capture devices for each of the plurality of audio capture device pairs comprises:
   for each of the plurality of audio capture device pairs, determining a difference in audio energy between the first and second audio capture devices at each frequency of a plurality of frequencies; and
   wherein the difference in audio energy for each of the plurality of audio capture device pairs comprises the difference in audio energy at a frequency in which the difference in audio energy is maximized.

5. The method of claim 4, wherein the plurality of frequencies comprise frequencies audible to human ears.

6. The method of claim 4, wherein a frequency selection function is used to select each frequency.

7. The method of claim 1, further comprising:
   determining captured audio energy for each of the first and second audio capture devices for each of the plurality of audio capture device pairs.

8. The method of claim 1, wherein the first and second audio capture devices comprise first and second unidirectional microphones.

9. The method of claim 8, wherein the first and second unidirectional microphones capture audio in opposite directions along an axis.

10. The method of claim 1, wherein the audio energy comprises an amplitude of a captured audio signal.

11. A microphone selection system, comprising:
    an interface configured to receive audio information captured via a plurality of audio capture device pairs, wherein each audio capture device pair comprises a first audio capture device and a second audio capture device, wherein neither the first audio capture device nor the second audio capture device is included in any of the other audio capture device pairs of the plurality of audio capture device pairs, and wherein a first axis along which at least a first pair of the audio capture device pairs are positioned crosses a second axis along which a second pair of the audio capture device pairs are positioned;
    a processing system configured to, based on the audio information, determine a difference in audio energy between audio captured by the first and second audio capture devices for each of the plurality of audio capture device pairs and select an audio capture device pair of the plurality of audio capture device pairs having the largest difference in audio energy.

12. The microphone selection system of claim 11, further comprising:
    the processing system configured to select an audio capture device from the audio capture device pair having the greater amount of audio energy.

13. The microphone selection system of claim 12, further comprising:
    the processing system configured to, if a ratio of audio energy captured by the first audio capture device to audio energy captured by the second audio capture device is within a threshold of 1, also select an audio capture device from the audio capture device pair having the lesser or equal amount of audio energy.

14. The microphone selection system of claim 11, wherein the processing system configured to determine the difference in audio energy between the audio captured by the first and second audio capture devices for each of the plurality of audio capture device pairs comprises:
    the processing system configured to, for each of the plurality of audio capture device pairs, determine a difference in audio energy between the first and second audio capture devices at each frequency of a plurality of frequencies; and
    wherein the difference in audio energy for each of the plurality of audio capture device pairs comprises the difference in audio energy at a frequency in which the difference in audio energy is maximized.

15. The microphone selection system of claim 14, wherein the plurality of frequencies comprise frequencies audible to human ears.

16. The microphone selection system of claim 14, wherein a frequency selection function is used to select each frequency.

17. The microphone selection system of claim 11, further comprising:
   the processing system configured to determine captured audio energy for each of the first and second audio capture devices for each of the plurality of audio capture device pairs.

18. The microphone selection system of claim 11, wherein the first and second audio capture devices comprise first and second unidirectional microphones.

19. The microphone selection system of claim 18, wherein the first and second unidirectional microphones capture audio in opposite directions along an axis.

20. The microphone selection system of claim 11, wherein the audio energy comprises an amplitude of a captured audio signal.

* * * * *